United States Patent [19]

Bray

[11] Patent Number: 4,724,155
[45] Date of Patent: Feb. 9, 1988

[54] LUBRICATION OF CUP-SHAPED CAN BODIES

[75] Inventor: James A. Bray, Salineville, Ohio

[73] Assignee: Weirton Steel Corporation, Weirton, W. Va.

[21] Appl. No.: 11,112

[22] Filed: Feb. 5, 1987

Related U.S. Application Data

[63] Continuation-in-part of Ser. No. 681,630, Dec. 14, 1984, abandoned.

[51] Int. Cl.[4] ............................................. B05D 1/04
[52] U.S. Cl. ...................................... 427/28; 427/27; 427/33; 427/233; 427/236; 427/424
[58] Field of Search ............... 427/27, 28, 33, 233, 427/236, 424

[56] References Cited

U.S. PATENT DOCUMENTS 2,888,362  5/1959  Starkey ............................ 118/630
3,645,778  2/1972  Nesteruk ............................ 427/33
4,170,193 10/1979  Scholes ............................ 118/634

FOREIGN PATENT DOCUMENTS 125639 of 1960  U.S.S.R. ............................ 427/33

Primary Examiner—Richard R. Bueker
Attorney, Agent, or Firm—Raymond N. Baker

[57] ABSTRACT

Cup lubricating process and apparatus in which cup-shaped can bodies are controllably conveyed in spaced relationship to each other through a lubrication application chamber. Lubricant is atomized to particle sizes permitting them to be gas borne and introduced into such chamber from a plurality of locations about the travel path for can bodies. Provision is made for augmented external surface deposition by electrically charging at least a portion of the gas-borne lubricant particles and electrically grounding can bodies individually during passage through such lubricant application chamber. Endless loop conveyor means are provided with adjustable features enabling a travel path to be adapted to differing dimension can bodies.

6 Claims, 6 Drawing Figures

LUBRICATION OF CUP-SHAPED CAN BODIES

This application is a continuation in part of copending application Ser. No. 681,630, filed Dec. 14, 1984 now abandoned.

This invention is concerned with controlling continuous in-line movement and atomized particle lubrication of cup-shaped sheet metal can bodies during transfer between work stations in a can body fabricating line.

An important contribution of the invention enables such lubrication to be carried out in-line without substantial interruption of sequential can body fabricating steps. A can body travel path is established through a lubricant application chamber providing controlled passage of can bodies in spaced relationship to each other while minimizing contact of conveyance means with the can bodies in order to minimize blocking lubricant particle deposition. A desired lubricant coating, e.g. of the type which eliminates the need for washing of the can bodies subsequent to fabrication, is obtained.

Figure 1:
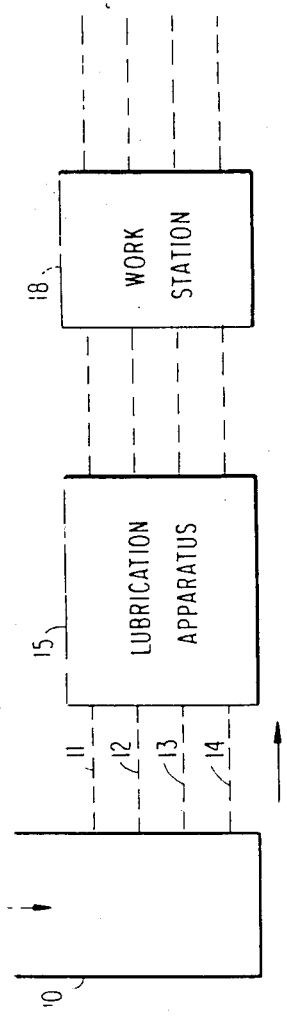
Figure 6:
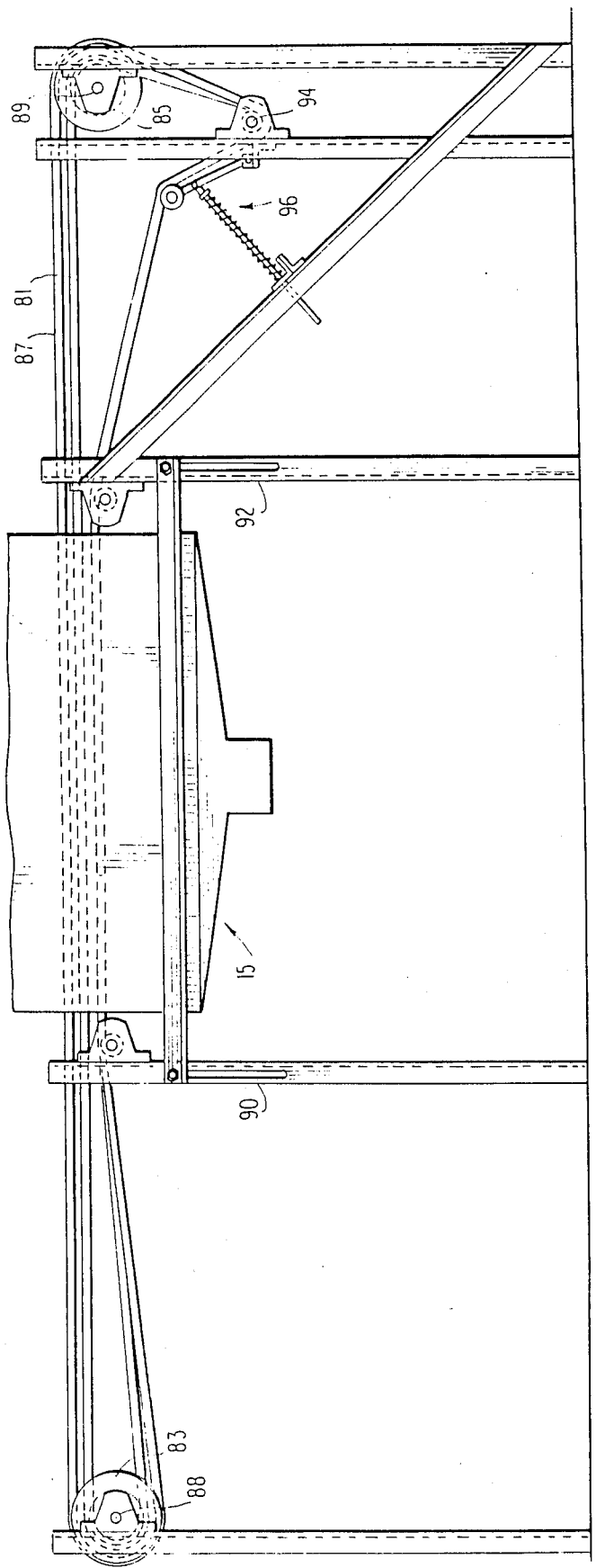
Figure 2:
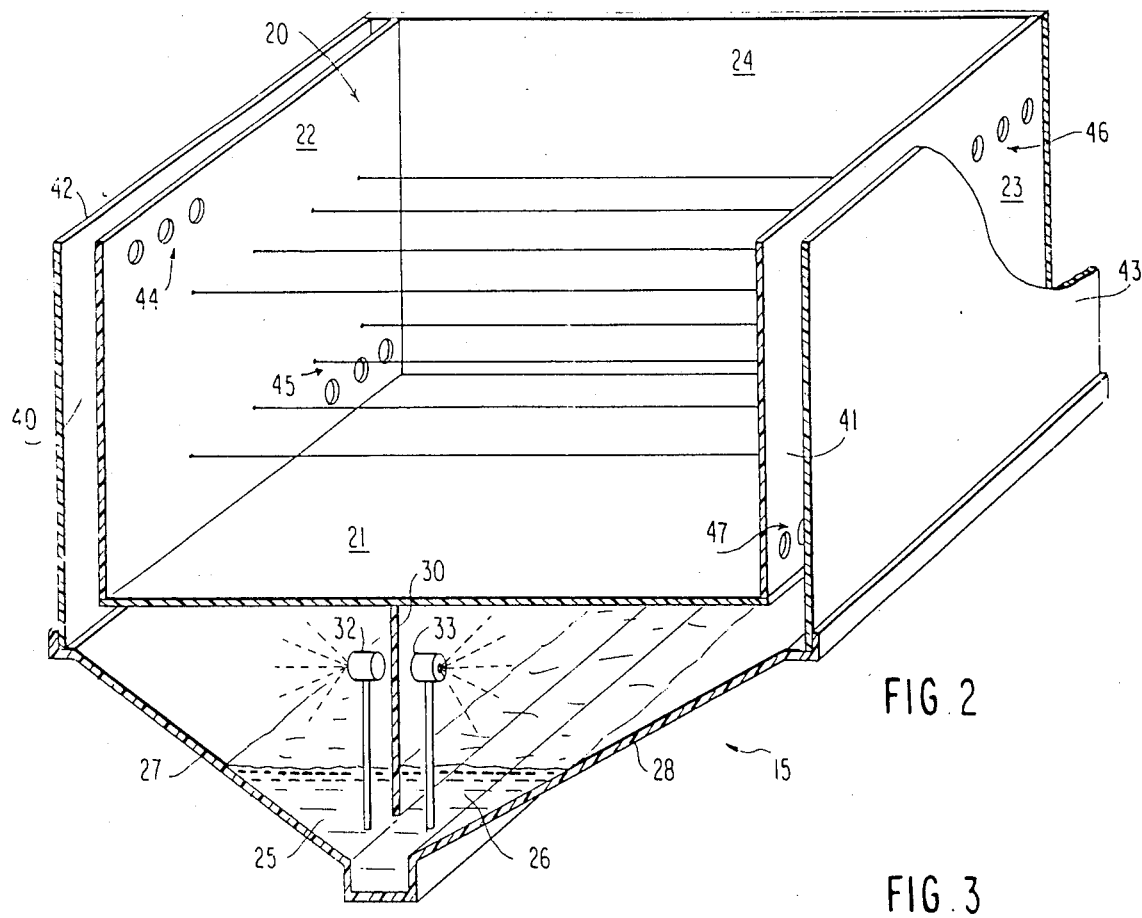
Figure 3:
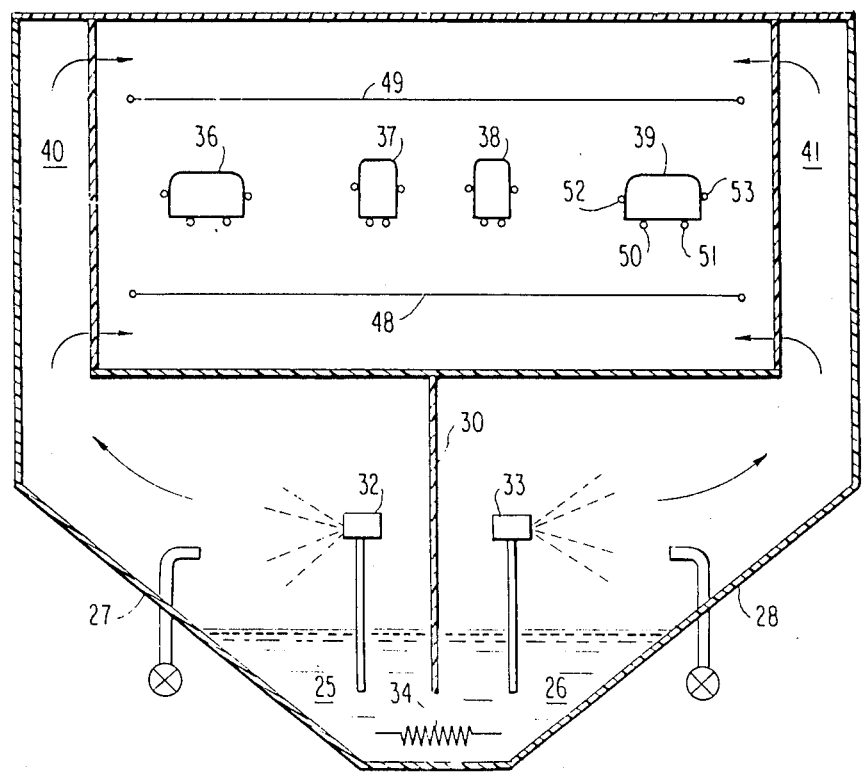
Figure 4:
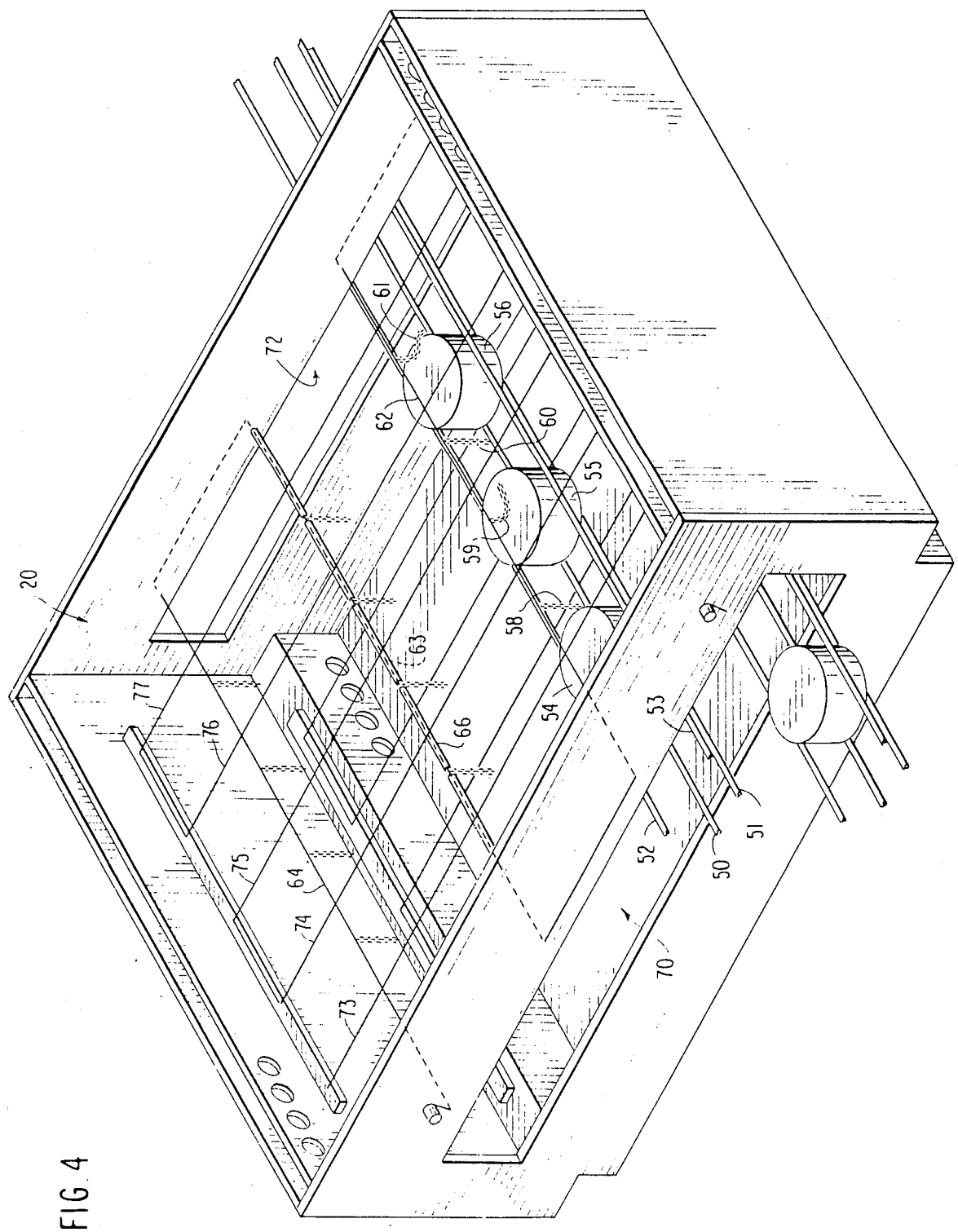
Figure 5:
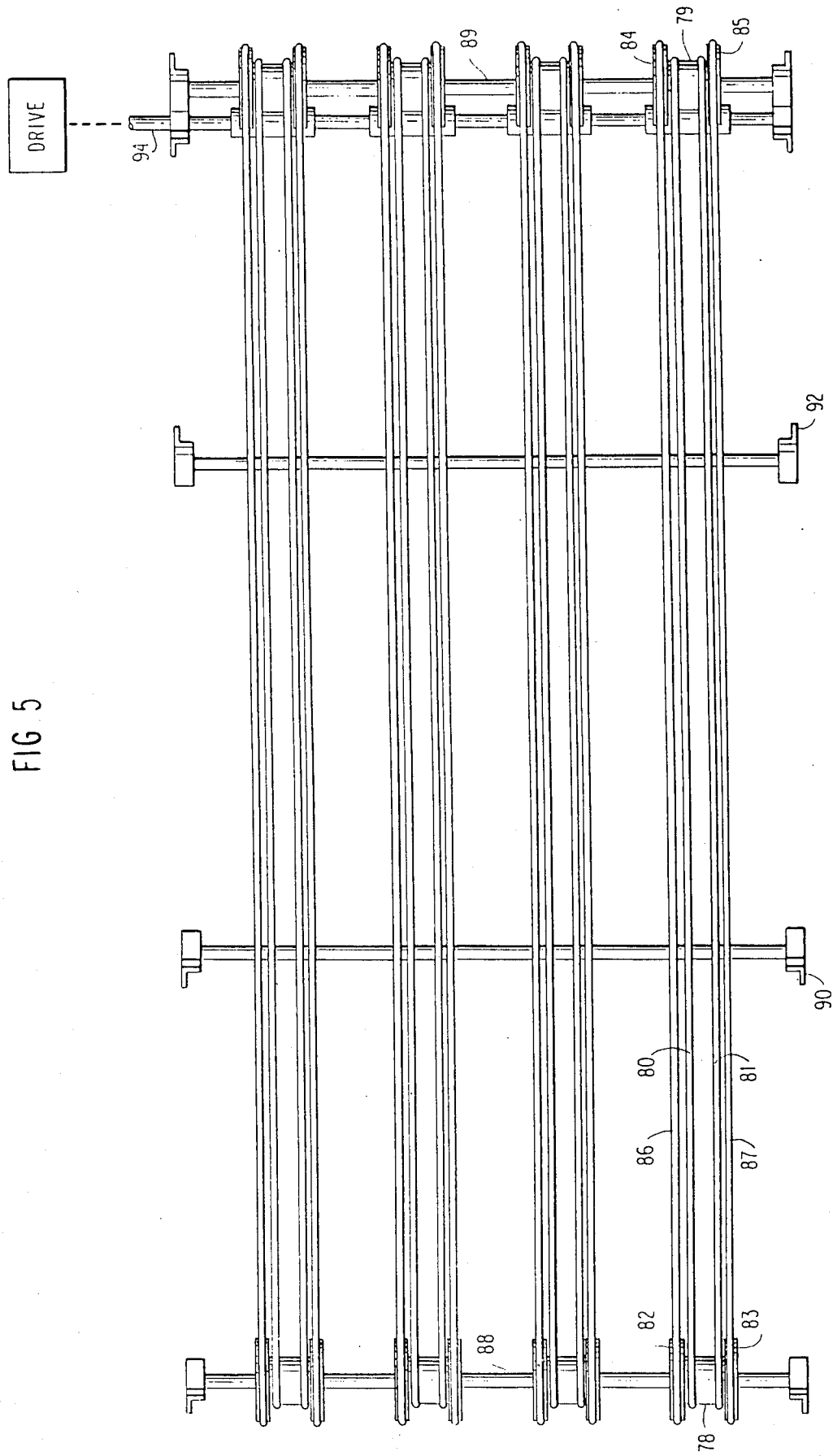

Other advantages and contributions of the invention are set forth in more detail in describing apparatus as shown in the accompanying drawings, in which:

FIG. 1 is a schematic lay-out plan of portions of a can body fabricating line including in-line lubricating apparatus in accordance with the invention, FIG. 2 is a schematic perspective view, with portions cut away and omitted for clarity, of a portion of the lubricant application apparatus of the invention, FIG. 3 is a schematic cross-sectional view, along a plane which is perpendicularly transverse to the direction of movement of can bodies, of lubricating apparatus in accordance with the invention, FIG. 4 is a perspective view, with portions cut away and omitted for clarity, of lubrication apparatus in accordance with the invention, FIG. 5 is a plan view showing adjustable means for supporting and stabilizing means during passage through lubricant application chamber in accordance with the invention, and FIG. 6 is a side elevational view of the apparatus of FIG. 5 showing, in addition, the location of a lubricant chamber and framing support structure.

During can-making operations, continuous-strip flat rolled sheet metal, such as flat rolled steel having a protective organic coating, is lubricated on both its planar surfaces before being cut into blanks. Shallow cups are formed from the blanks, usually at the blanking station. Subsequent forming operations, e.g. redrawing at other stations, are required to produce the extended-height side wall unitary can bodies more commonly used in the manufacture of two-piece cans for soups and vegetables. Additional lubrication of the work product can be helpful in such subsequent forming operations where insufficient lubrication remains from the flat metal lubrication stage due, e.g., to delays occurring before such subsequent operations.

The present invention provides for such supplemental lubrication of can bodies with apparatus operable in high-speed can body fabricating lines while the cup-shaped work product is continuously moving. The invention provides can body handling for such lubrication purposes without interfering with in-line movement of the work product.

As shown schematically in FIG. 1, shallow cups from cup source 10 are directed along individual paths 11, 12, 13, 14 into lubrication apparatus 15 from which they continue along their individual travel paths to work station 18 at which another operation, for example a redrawing operation, is carried out. As described in greater detail later, the cup-shaped sheet metal can bodies are controllably conveyed, i.e. uniformly oriented in spaced relationship to each other during passage through lubrication apparatus 15.

As shown in FIG. 2, lubrication apparatus 15 includes a lubricant application chamber 20, through which the travel path(s) for can bodies extend as indicated by FIGS. 3 and 4.

Lubricant application chamber 20 is defined by wall means, such as chamber bottom wall 21, side walls 22, 23, a wall 24 and entrance and top walls; an exit means for wall 24 and the entrance and top walls are not shown in the perspective view of FIG. 4. As taught herein, such chamber defining wall means can be formed from non-electrically conductive plastic sheet stock, such as polypropylene.

In carrying out this invention, lubricant particles are generated in sizes permitting the lubricant particles to be borne and transported by a gaseous medium. In one embodiment, lubricant in a desired liquid form, as supplied or established using heat, is provided in lubricant reservoirs 25, 26. This lubricant sump arrangement is established by sump walls such as side walls 27, 28 and central divider wall 30; such sump walls which define the reservoirs for lubricant can also be formed from plastic sheet stock. Individual atomizing means, such as 32, 33, are associated with each lubricant reservoir. Liquid lubricant is drawn from each reservoir and atomized utilizing suitable atomizing means, pneumatic or ultrasonic; such atomizing means per se are known and commercially available. Suitable heating means for controlling the temperature of the lubricant, such as heating element 34, are provided to controllably establish and/or maintain desired lubricant temperature.

Plural lubricant reservoirs, each with associated atomizing means along with gas-borne lubricant particle flow means, as taught herein, provide for dispensing the gas-borne lubricant particles, as atomized in the lubricant sump means, into the lubricant application chamber for contact with surfaces of the work product during controlled passage therethrough.

Travel paths for can bodies such as 36, 37, 38 and 39 of FIG. 3 are established in a unique manner which contributes significant advantages in supporting and stabilizing cups in desired orientation utilizing endless-belt loop means as shown and described in more detail in relation to FIGS. 4, 5 and 6.

The movement of gas-borne lubricant particles is controlled so as to be directed toward the travel path(s) for can bodies from apertures both above and below such travel path(s). For example, gas-borne particles can be directed to approach the work product travel paths from apertures leading into the application chamber from gas flow passages 40, 41 (FIG. 3). The latter passages are defined on opposite lateral sides of the lubricant application chamber by chamber walls 22, 23 in cooperation with passage walls 42, 43 respectively.

In the embodiment of FIG. 2, the gas-borne lubricant particles enter the lubrication chamber 20 through apertures at a plurality of locations, such as 44, 45, 46 and 47, in chamber side walls 22, 23. Similar gas flow arrangements can be made through other wall portions. The aperture means are distributed for delivery of gas-borne lubricant particles from a plurality of directions above and below can body travel paths through the lubricant application chamber 20. For example, from above and below a horizontal travel path for work product as well as along the direction of movement between leading and trailing ends of such travel path. Location of such aperture means is selected to provide the desired gas-borne flow of lubricant particles for flow-impingement purposes.

Arrangement of the application chamber above the lubricant sump means, as shown in FIGS. 2 and 3, provides for gravity drainage return of lubricant deposited on wall surfaces or near openings in the various passages.

To augment external-surface coverage including flange metal of the cup-shaped work product, at least a portion of the gas-borne lubricant particles can be electrically charged for deposition on such surfaces by high voltage charging wires 48, 49 (FIG. 3) located above and below the can body travel path(s). As seen in FIGS. 2 and 4, a plurality of such charging wires can be distributed along the direction of travel of can bodies throughout the lubricant application chamber 20; such wires extend across substantially the full lateral dimension of such chamber.

The endless-belt loop means establish travel paths through the lubricant application chamber for supporting and stabilizing the sheet metal cups in spaced relationship and axially oriented as desired. As shown in FIGS. 3 and 4, the endless-belt loops have a curvilinear exterior cross-sectional periphery which results in a tangential point contact with work product so as to minimize blockage of, or interference with, deposition of lubricant particles. The can bodies are controllably conveyed in uniformly spaced relationship and desired lubrication is obtained with open ends of the can bodies preferably oriented downwardly; but, can bodies can be otherwise oriented.

Flexible plastic tubular material, such as polyurethane round belting, available from Eagle Belting Co., Des Plaines, Ill., is used for endless-belt loops. The endless belts stabilize as well as support cup-shaped work product during conveyance through chamber 20. For example, in FIG. 3 loops 50, 51 contact the open end portions of the downwardly-oriented can body 39 to support its weight; endless loops 52, 53 contact the side wall of can body 39 at diametrically opposite sides to stabilize it in its upright position.

FIG. 4 depicts means for electrically grounding can bodies individually during passage in spaced relationship through lubricant application chamber 20 when electrostatic energy is to be used to augment flow-impingement particle deposition on external surfaces of the cup-shaped work product. Individual ground contact means are provided along the work product travel paths for repetitious grounding of individual can bodies. Referring to the travel path defined by endless-belt loops 50, 51, 52 and 53, can bodies 54, 55 and 56 are contacted by flexible metallic conductors 58, 59, 60 and 61 during passage through chamber 20. Such flexible contact conductors are grounded through wire 62, which is grounded to the support frame, or otherwise; the other ground wires shown are similarly grounded. Exterior surfaces of such elongated grounding wires are electrically insulated as they extend through the chamber 20 so as to avoid accumulation of lubricant particles and minimize current loss. For example, ground wire 63 is covered by electrical insulation 66 for such purposes. However, the work product contact conductors are exposed to facilitate electrical grounding of individual can bodies.

Flexible chain linkages, e.g. of the key-chain type, provide desired flexibility for electrical contact. The periodic contact of such flexible chains with work product provides a self-cleaning action of lubricant which might otherwise accumulate on such chains, or the grounding conductor can be otherwise selected or positioned to minimize accumulation of lubricant particles. With electrical grounding of can bodies, charged gas-borne lubricant particles can be attracted to uncoated exterior surface portions of such can bodies.

As seen in FIG. 3, endless-belt loop means can control passage of can bodies of a particular configuration along a selected travel path. For example, can body 39, and the other can bodies along its travel path, have a larger diameter than can body 38, and the other can bodies along the latter's travel path. Teachings of the present invention relating to adjustable location of the endless-belt loops, as described in more detail later in relation to FIGS. 5 and 6, enable implementation of this feature which adds product flexibility among the travel paths for production installations.

The quantity of gas-borne particles can be regulated by gas supplied to the lubricant sumps. In a specific embodiment, gas flow from the atomizing sumps to the application chamber is selectively adjusted to the speed of the line; that is, at line speeds above a selected median, the gas flow is increased; at lines speeds below the selected median, the gas flow is decreased. Thus, the movement or "flow rate" of lubricant particles into the application chamber can be regulated by regulating gas, e.g. air, supplied to the lubricant sump(s). Such gas can be supplied as a part of pneumatic atomizing and/or supplied or augmented by regulating gas supplied separately to the sump(s) as shown in FIG. 3.

Such separately supplied gas to the sump(s) can be regulated to control gas flow from the atomizing sump(s) to the application chamber to supply lubricant particles in accordance with requirements of the line speed.

In the embodiment of FIG. 4, an insulated grounding wire is positioned above each work product travel path and extends in the direction of work product movement. Flexible metallic conductors, exposed for electrical contact with each can body, are electrically connected to the ground wires. A plurality of such flexible conductors are connected to each ground wire along each travel path so that plural periodic grounding of each can body occurs during its controlled passage between entrance port 70 and exit port 72 of the lubricant application chamber 20. Charging wires, such as 73, 74, 76 and 77, are positioned to extend laterally of the chamber.

Referring to FIG. 5, endless-belt loops for defining each travel path for continuous-line passage through deposition chamber means are shown in plan view along with pulley support means. For example, pulleys 78, 79 support endless-belt loops 80, 81 which contact the open ends of the can bodies for support thereof. Pulleys 82, 83 and 84, 85 support endless-belt loops 86, 87 which contact the side wall of a can body at diametrically opposite sides thereof.

Different pulleys can be substituted to establish dimensionally differing travel paths and/or the pulleys can be adjustably mounted along support shafts 88, 89. The number of travel paths can be varied, the width between support loops, and the height of and width between stabilizing loops can be selected accordingly.

The side elevational view of FIG. 6 shows the lubrication apparatus 15 in place on support framing members, such as 90, 92 which include means for adjusting the vertical position of such lubrication apparatus.

Drive means including driveshaft 94 are provided, as well as loop tension adjustment means 96, for the endless-belt loops. Groups of endless-belt loops which establish a travel path can be driven together. The present teachings also provide for individual loops to be driven individually; for example, loops on diametrically opposite sides of a vertically oriented can body can be driven at slightly differing speeds to provide a slow rotational movement of a can body about its central longitudinal axis during passage through chamber 20.

The tubular-belt conveyors are preferably of curvilinear cross-sectional configuration, e.g. circular, to minimize peripheral contact with can bodies being conveyed.

Data for a specific embodiment for carrying out the invention are set forth below:

| Chamber 20 | |
| --- | --- |
| Longitudinal length (direction of can travel) | 37" |
| Lateral width (transverse to direction of movement of can bodies) | 44" |
| Height | 24" |
| Wall material (thickness) (commercial polypropylene sheet) | ¼" |
| Lubricant | |
| Commercially available Petrolatum | |
| Heat to about 160 F. | |
| Atomizer | |
| Model #1/8-JJ-SS-J22D-SS | |
| Spraying System, Inc. | |
| Wheaton, Ill 60187 | |
| Endless-Belt Loops | ¼" diameter polyurethane tubing |
| Charging wire, DC potential | about 15,000 to 30,000 volts (avoiding leakage of current, arcing or corona discharge) |
| Line Speed (adaptable to commercial can-making line practice) | |
| For Can Sizes 211 × 400, 300 × 407 and 303 × 406 | typically 150 fpm |
| Lubricant Particle size and Gas Pressure Transport | |
| Particle size - about 25 microns at 20 psi | |
| Particle size - about 20 microns at 30 psi | |
| Air pressure supplied to sumps - about 30 psia | |

Can sizes are expressed in diameter and height; the 211×400 (2-11/16' diameter, 4' height) is a typical soup can, 300×407 is a typical pet food can, and the 303×406 is typically used for fruits and vegetables.

While specific data including materials, dimensions and configurations have been set forth for purposes of describing the invention, modifications thereof can be made by those skilled in the art in the light of the present teachings. Therefore, for purposes of defining the scope of patentable subject matter, reference shall be had to the appended claims.

I claim:

1. Method for atomized-particle lubrication of cup-shaped sheet metal can bodies while continuously moving along a can body fabrication line comprising, in combination, the steps of providing a lubricant sump including a reservoir of lubricant in liquid form, supplying gas at a pressure above atmospheric to such lubricant sump, atomizing such liquid lubricant into particles capable of being gas borne, providing a lubricant application chamber defined by wall means, interconnecting such application chamber and lubricant sump for gas flow purposes, transporting such atomized particles into such application chamber with gas supplied to such lubricant sump, supplying cup-shaped can bodies having a closed end wall and a side wall extending longitudinally therefrom symmetrically with a can body central longitudinal axis to define an open end longitudinally opposite to such closed end wall, providing a travel path for continuous movement of such can bodies through such lubricant application chamber by supporting and stabilizing individual can bodies with endless belt means of curvilinear cross-sectional configuration, controlling continuous-movement of such can bodies into, through and out of such lubricant application chamber with such can bodies being oriented in spaced relationship to each other during such passage with their central longitudinal axes being parallel to each other and with their open ends facing in the same direction, and directing movement of such gas-borne lubricant particles into the lubricant application chamber from a plurality of locations above and below such can body travel path for flow impingement deposition of gas-borne particles on such can bodies during passage through such chamber.

2. The method of claim 1 including controlling the temperature of such lubricant prior to atomizing.

3. The method of claim 1 in which the step of directing movement of gas-borne lubricant particles into the lubricant application chamber includes quantitatively controlling the flow rate of such particles into such chamber.

4. The method of claim 3 in which the step of controlling continuous-movement passage of can bodies through such application chamber includes controlling the rate of movement of such can bodies through such chamber.

5. The method of claim 4 in which control of the quantitative flow rate of gas-borne particles is coordinated with such control of rate of movement of can bodies through such application chamber.

6. The method of claim 1 in which deposition of lubricant particles on exterior surfaces of such can bodies is augmented by electrically charging at least a portion of such gas-borne lubricant particles while flowing through the lubricant application chamber, and electrically grounding such spaced can bodies by contacting external surfaces thereof individually a plurality of times during passage along such travel path through such lubricant application chamber.

* * * * *